United States Patent
Zediker et al.

[19]

[11] Patent Number: 5,847,817
[45] Date of Patent: Dec. 8, 1998

[54] METHOD FOR EXTENDING RANGE AND SENSITIVITY OF A FIBER OPTIC MICRO-DOPPLER LADAR SYSTEM AND APPARATUS THEREFOR

[75] Inventors: Mark S. Zediker, Florissant, Mo.; Robert R. Rice; Jack H. Hollister, both of Chesterfield, Mo.

[73] Assignee: McDonnell Douglas Corporation, St. Louis, Mo.

[21] Appl. No.: 783,009

[22] Filed: Jan. 14, 1997

[51] Int. Cl.$^6$ .................................................. H01S 3/00
[52] U.S. Cl. .......................................... 356/5.09; 356/28.5
[58] Field of Search ................................. 356/5.04, 28.5

[56] References Cited

U.S. PATENT DOCUMENTS

| | | | |
|---|---|---|---|
| 5,151,747 | 9/1992 | Nourrcier | 356/5 |
| 5,267,011 | 11/1993 | Callender | 356/5 |
| 5,534,993 | 7/1996 | Ball et al. | 356/5.09 |
| 5,621,514 | 4/1997 | Paranto et al. | 356/5.09 |

*Primary Examiner*—Mark Hellner
*Attorney, Agent, or Firm*—Westerlund & Powell; Raymond H.J. Powell, Jr.; Robert A. Westerlund

[57] ABSTRACT

A method for compensating a reference signal used in a coherent receiver of a micro-doppler sensor having a transmitter includes the steps for: (a) repeatedly measuring phase differences between a signal emitted by the transmitter a first time and a previous signal emitted at a previous time so as to produce a plurality of phase error signals; (b) accumulating the phase error signals over a propagation time between the transmitter and the coherent receiver so as to produce a cumulative phase error signal; and (c) modulating a signal produced by the transmitter at the end of the propagation period so as to generate a compensated reference signal having a phase characteristic substantially identical to the signal produced by the transmitter at the beginning of the propagation period. A phase error or noise compensator, which can form part of a micro-doppler ladar system, is also described.

32 Claims, 4 Drawing Sheets

METHOD FOR EXTENDING RANGE AND SENSITIVITY OF A FIBER OPTIC MICRO-DOPPLER LADAR SYSTEM AND APPARATUS THEREFOR

BACKGROUND OF THE INVENTION

The present invention relates generally to ladar systems. More specifically, the present invention relates to a method for extending the effective range and sensitivity of a micro-doppler ladar system by increasing its effective coherence length. A ladar system specifically configured to implement this method is also disclosed.

Lidar, laser radar, optical radar, and ladar (hereinafter "ladar") are all names used for "radar" systems utilizing electromagnetic radiation at optical frequencies. The radiation used by ladar is at wavelengths which are 10,000 to 100,000 times shorter than that used by conventional radar. Radiation (photons) scattered by the target of interest is (are) collected and processed to yield information about the target and/or the path to the target. Early conventional radars and ladars observed only the intensity of the collected radiation and the time delay from transmission to collection. Modern ladars also observe intensity in addition to time delay. However, some so-called "coherent ladars" recurrently record information about the phase of the scattered radiation with respect to a local reference.

Ladar systems may be further classified as continuous-wave (CW) or pulsed as well as focused or collimated. CW ladar systems are generally used when the signal may be integrated over long time periods and/or when the target of interest is nearby. They are also convenient to use when measuring average properties of the path to the target. Focusing is mainly performed using CW ladars to permit them to make a more sensitive measurement over a smaller span of ranges. In contrast, pulsed ladars use much higher power levels during the laser pulse than can be maintained with a CW laser, producing higher signal-to-noise ratios for the collected radiation. Pulsed ladars are usually chosen for long-range remote sensing and when signal integration over a long time period is impractical.

Ladar uses the same principle as RADAR, i.e., the ladar system transmits light to a target of interest, the transmitted light interacts with and is changed by the target, and some of this light is reflected/scattered back (returned) to the ladar system where it can be analyzed. The change in the properties of the backscattered light enables some property of the target to be determined. For example, the round trip time required for the light to travel to the target of interest and back to the ladar system is commonly used to determine the range R to the target.

Ladar systems are generally divided into three generic types: range finding systems; DIAL systems; and doppler ladar systems. Range finders are the simplest type of ladar system; they are used to measure the distance from the ladar system to a solid or hard target. Differential Absorption Ladar (DIAL) systems are used to measure chemical concentrations (such as ozone, water vapor, pollutants) in the atmosphere. A DIAL system uses two different laser wavelengths which are selected so that one of the wavelengths is absorbed by the molecule of interest while the other wavelength is not. The difference in intensity of the two return signals can be used to deduce the concentration of the molecule being investigated.

Doppler ladar systems are used to measure the velocity of a target of interest. When the light transmitted from the ladar system strikes a target moving towards or away from the ladar system, the wavelength of the light reflected/scattered off the target will be changed slightly. This is known as a Doppler shift—hence the term Doppler Ladar. If the target of interest is moving away from the ladar system, the return light will have a longer wavelength (sometimes referred to as a red shift); if the target is moving towards the ladar system, the return light will be at a shorter wave-length (producing a so-called blue shift).

Ladar systems may also be classified as either bistatic or monostatic. Bistatic ladar systems require separate locations for the transmitter and for the receiver. In contrast, monostatic ladar systems require only one location. It will be appreciated that the location of a target is determined by a monostatic, pulsed, ladar system on the basis of knowledge of the laser pointing direction, and of the time delay between the firing of the laser pulse and the detection of the signal.

A first advantage of coherent (homodyne or heterodyne) ladar systems is that such ladar systems preserve the phase information of the backscattered photons. For example, the coherent ladar receiver creates an electrical current corresponding to the phase of the backscattered light. Thus, in addition to the intensity of the backscattered photons which is recorded in conventional non-coherent (or incoherent or direct detection) ladar systems, the signals produced by the coherent ladar system contain additional information about the frequency spectrum and polarization of the backscattered photons. The first moment or mean value of the frequency spectrum yields the target's mean velocity.

A second advantage of a coherent ladar system is its greater sensitivity than non-coherent ladar systems under conditions of low signal-to-noise ratio (SNR). This is due to four reasons.

First, a mode of operation called shot noise limited (SNL) may be employed. This is possible because both the signal power (square of the current) and the local oscillator (LO) shot noise power in the detector's output are proportional to the incident LO optical power. The LO power may be increased until the LO shot noise dominates the other noise sources, such as background light, dark current, Johnson (thermal) noise, and amplifier noise. The signal power increases automatically with the LO shot noise power. This procedure, equivalent to setting the other noise sources to zero, can greatly increase the SNR.

Second, the oscillating signal at the detector output is only due to photons which are spatially phase matched to the LO, effectively eliminating noise from background light at other wavelengths and from other directions. Therefore, coherent ladar is not degraded by daytime operation.

Third, the oscillating current at the frequency difference between the LO and the backscattered light may be passed through a very narrow band electronic filter which eliminates all noise in frequency regions outside the predicted possible signal locations. This is only possible because the optical heterodyne (homodyne) process preserves the spectrum of the optical signal; simply translating it from THz to MHz. This elimination of noise has not yet been achieved in non-coherent ladar. Since the non-coherent optical detection step combines photons of all wavelengths into electrical currents that overlap in frequency, no electrical filtering is possible. A sufficiently narrow bandpass optical filter in front of the detector would work, but such narrow band optical filters are not currently available.

Fourth, the higher frequency of the coherent ladar electrical current, the frequency difference between the LO and the backscattered light, which is selectable by the system designer, results in less 1/f noise.

In short, advantages of conventional coherent ladar systems include the straightforward measurement of target velocity and vibration, and much greater sensitivity. The benefits derived from coherent ladar systems come at the cost of the addition of the LO laser, greater sensitivity to alignment, greater sensitivity to phase perturbations from the optics elements, and greater sensitivity to phase perturbations from the atmosphere.

Optical detection in coherent ladar systems starts with illuminating the optical detector with a continuous-wave laser beam produced by a local oscillator (LO), in addition to the backscattered photons. The detector responds to the square of the total optical field illuminating it and, therefore, produces the cross product of the backscattered and LO optical fields. Both the backscattered and LO fields are sinusoids, as are their cross products. It will be appreciated that these products must contain both sum and difference frequency terms. The desired information is contained in the portion of the detector's output current that oscillates at the frequency difference between the LO laser beam and any received, backscattered light.

The LO frequency is usually offset from the anticipated frequency of the backscattered photons; in contrast, polarization, direction, and curvature of the local oscillator output must closely match that of the backscattered light. The desired information is contained in the portion of the detector's output signal that oscillates at the frequency difference between the laser beam generated by the local oscillator and the backscattered light. This oscillating current or "signal" may be conveniently processed with standard electronic circuits.

An important application of coherent ladar systems is the detection and classification of a non-cooperative target. It will be appreciated that the target of interest can be classified and identified on the basis of its micro-doppler signature. The ability of micro-doppler ladar to detect target vibrations and thereby classify non-cooperative targets has been confirmed by a number of Government initiatives, including the Radiant Mist—Low Probability of Intercept ATD program. According to the micro-doppler signature identification technique, vibrations of the target phase modulate the backscattered laser light and the induced modulation is detected by coherent (homo-dyne or heterodyne) detection. To detect the vibrations reliably using heterodyne detection for example, the laser transmitter and receiver local oscillators each must have natural oscillation linewidths that are narrower than the spectrum of the induced phase deviations.

However, it is difficult to obtain a sufficiently narrow linewidth for some applications, particularly where cost, complexity and weight are considerations, as they are in systems intended to be mounted in moving vehicles such as airplanes. Phase noise in a laser source is generally reduced by careful design and isolation of the source from external perturbations such as vibrations of the laser structure or fluctuations in laser drive current. Such solutions are typically expensive and result in large physical packages, which are undesirable, for example, in compact, rugged military radar equipment for combat aircraft.

Moreover, if the coherence length $I_c$ of the transmit laser beam is shorter than the round trip propagation delay to the target, homodyne detection can be used in which a sample of the laser beam produced by a master oscillator is used as a local oscillator (LO) reference. It will be appreciated that this is indicative of having a very narrow laser linewidth, i.e., $2R<<I_c=c/\Delta v$, where R is the range to the target of interest and $\Delta v$ is the bandwidth of the transmit laser beam.

The problem is that after the transmit laser beam has propagated beyond the coherence length $I_c$ of the transmitter, i.e., $R>>I_C$, the phase of a backscattered return signal is no longer highly correlated with the phase of the transmit laser beam. Were it possible to keep track of the phase drift of the laser beam produced by the master oscillator, or the transmit laser beam, and compensate for phase drift at the receiver, homodyne detection would provide the most sensitive method to detect and process the backscattered light reflected from the target of interest.

What is needed is a method to track random phase drift of the laser beam output by a master oscillator and compensate for the cumulative phase error at the receiver, thereby improving the capability of a micro-doppler ladar system to detect and resolve low frequency vibrations of the target of interest. It will be appreciated that this capability is critical in many non-cooperative target classification applications where obtaining adequate performance at low SNR levels is problematic using conventional homodyne detection methods.

SUMMARY OF THE INVENTION

Based on the above and foregoing, it can be appreciated that there presently exists a need in the art for a phase drift compensated micro-doppler ladar system which overcomes the above-described deficiencies. The present invention was motivated by a desire to overcome the drawbacks and shortcomings of the presently available technology, and thereby fulfill this need in the art.

One preferred embodiment according to the present invention is a method for tracking and compensating for phase drift in homodyne transmitter-receiver ladar systems. Another preferred embodiment according to the present invention is an apparatus for accumulating and compensating for phase errors in a micro-doppler ladar system when the target of interest is beyond the coherence length of the transmit laser beam. Thus, the latter preferred embodiment concerns a cumulative phase error compensator located between the transmitter and the coherent receiver that provides these desirable features so as to permit construction of a practical, highly accurate and sensitive micro-doppler ladar system.

One object according to the present invention is to provide a fiber optic micro-doppler ladar system having a greater sensitivity than that of a conventional homodyne coherent ladar system.

Another object according to the present invention is to provide a micro-doppler ladar system having an effective coherence length which is greater that the actual coherence length of the transmit laser beam. According to one aspect of the present invention, the micro-doppler ladar system including a cumulative phase drift compensator is not phase noise limited for target ranges exceeding the coherence length by a significant percentage. According to another aspect of the present invention, the provision of a cumulative phase drift compensator avoids the need for costly precision elements as well as the need for rigid and heavy mounts for the less-costly elements.

Still another object according to the present invention is to provide a micro-doppler sensor which is insensitive to phase noise.

A still further object according to the present invention is to provide a fiber optic micro-doppler ladar system which can be fabricated at a low cost. Major cost benefits are achieved by leveraging on fiber optic amplifier development in the telecommunications field and by improved sensitivity of the coherent receiver. According to one aspect of the present invention, a micro-doppler laser system would include a simple, low cost solid state master oscillator as a source to drive a high power fiber optic amplifier in a Master Oscillator—Power Amplifier (MO-PA) configuration which could generate adequate output power to allow long range classification of target aircraft (for example). Since a cumulative phase drift compensator is used to offset phase error in the receiver, the effective range of the micro-doppler ladar system would be appreciably greater than that predicted for the simple, low cost solid state master oscillator.

These and other objects, features and advantages according to the present invention are provided by a method of operating a micro-doppler ladar system including a transmitter, a phase error compensator, and coherent receiver for identifying and analyzing a target of interest. Advantageously, the method includes steps for:

generating a primary laser beam;

amplifying the primary laser beam in an optical fiber amplifier so as to generate a transmit laser beam;

transmitting the transmit laser beam towards the target of interest;

generating first and second secondary laser beams responsive to the primary laser beam;

generating a mixed laser beam by mixing the first and second secondary laser beams;

generating an electrical signal indicative of the target of interest responsive to both received backscattered light produced by interaction between the transmit laser beam and the target of interest and the mixed laser beam;

determining range and velocity responsive to the electrical signal; and ascertaining a characteristic signature of the target of interest different from both range and velocity responsive to the electrical signal.

Moreover, a method for compensating a reference signal used in a coherent receiver of a micro-doppler sensor having a transmitter includes the steps of: (a) repeatedly measuring phase differences between a signal emitted by the transmitter at a first time and a previous signal emitted at a previous time so as to produce a plurality of phase error signals; (b) accumulating the phase error signals over a propagation time period between the transmitter and the coherent receiver so as to produce a cumulative phase error signal; and (c) modulating a signal produced by the transmitter at the end of the propagation time period so as to generate a compensated reference signal having a phase characteristic substantially identical to the signal produced by the transmitter and the beginning of the propagation time period.

These and other objects, features and advantages according to the present invention are provided by a micro-doppler ladar system for identifying and analyzing a target of interest. Preferably, the ladar system includes a transmitter for producing a transmit laser beam and a laser beam sample, a coherent receiver responsive to backscattered light produced by interaction of the transmit laser beam with the target of interest and generating range and velocity data and a characteristic signature of the target of interest responsive to the backscattered light and a phase compensated laser beam, a phase noise compensator for generating the phase compensated laser beam responsive to the laser beam sample, and a controller for controlling operation of the transmitter, the phase noise compensator, and the receiver.

According to one aspect of the invention, the phase noise compensator includes a phase error sensor for generating a phase error signal responsive to the laser beam sample during a predetermined short time period, a phase error accumulator for accumulating N ones of the phase error signal, where N is a positive integer, to thereby generate a cumulative phase error signal, and a phase modulator for correcting the phase of the laser beam sample responsive to the cumulative phase error signal to thereby generate the phase compensated laser beam.

According to another aspect of the invention, the phaser error sensor includes a beam splitter receiving the laser beam sample and generating first and second laser beams, an optical mixer for generating a mixed laser beam, an optical fiber operatively connected between the beam splitter and the optical mixer for transmitting the first laser beam, a delay loop operatively connected between the beam splitter and the optical mixer for delaying the second laser beam for the predetermined short time period, and a double balanced receiver receiving the mixed laser beam for generating the phase error signal. The phase error sensor may also be a Mach Zehnder interferometer with unequal path lengths.

These and other objects, features and advantages according to the present invention are provided by a micro-doppler ladar system for identifying and analyzing a target of interest. Preferably, the micro-doppler ladar system includes a first device for generating a primary laser beam, a second device for amplifying the primary laser beam so as to generate a transmit laser beam, a third device for transmitting the transmit laser beam towards the target of interest, a fourth device for measuring phase error between the primary laser beam and a delayed primary laser beam to thereby generate a phase error signal, a fifth device for compensating the primary laser beam responsive to the phase error signal so as generate a phase compensated primary laser beam, a sixth device receiving backscattered light produced by interaction between the transmit laser beam and the target of interest and the phase compensated primary laser beam for generating an electrical signal indicative of the target of interest substantially free of phase noise, a seventh device for determining range and velocity responsive to the electrical signal, and an eighth device for determining a characteristic signature of the target of interest different from both range and velocity.

These and other objects, features and advantages according to the present invention are provided by a phase error compensator for a micro-doppler ladar system having a transmitter producing a primary laser beam and a transmit laser beam and a receiver receiving backscattered light and a reference laser beam and adapted to identify and analyze a target of interest. Preferably, the phase error compensator includes a phase error sensor receiving a primary laser beam and a delayed laser beam and generating a phase error signal corresponding to the phase difference therebetween, a phase error processor receiving N ones of the phase error signal during a predetermined time period for generating an phase error compensation signal, and a phase modulator receiving the primary laser beam and the phase error compensation signal for generating the reference laser beam.

These and other objects, features and advantages according to the present invention are provided by a vibration sensor for generating a vibration signature which includes an equal path interferometer, wherein:

a first optical path includes an amplifier for amplifying a primary laser beam so as to generate a transmit laser beam;

the first optical path includes a path section through a naturally occurring environment;

a second optical path includes a phase error sensor for generating a signal indicative of phase error during a propagation period of the transmit laser beam; and the second optical path includes a phase modulator for phase error correcting the primary laser beam so as to produce a cumulative phase drift compensated laser beam having a delay equal to the propagation period.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

The ladar system according to the present invention advantageously utilizes, but is not limited to, a high power fiber optic laser (HPFOL) architecture which provides high efficiency, scalable output power, and unprecedented packaging flexibility. The HPFOL architecture also offers a highly effective transmitter solution for micro-doppler sensor systems, especially for very long target classification ranges, e.g., ranges up to 100's of kilometers, which requirement translates into the need for a high average power transmitter. The range requirement also translates into a need for a receiver which is insensitive to phase noise.

As discussed briefly above, any micro-doppler ladar system works by transmitting a highly coherent signal to a target that phase modulates the reflected or backscattered light. The backscattered light is detected by a coherent receiver that recovers the induced phase modulation and hence the vibration spectrum of the target. The nature of the target (friend or foe) can be classified by comparing its vibration spectrum with spectra stored in a data base.

Figure 1:
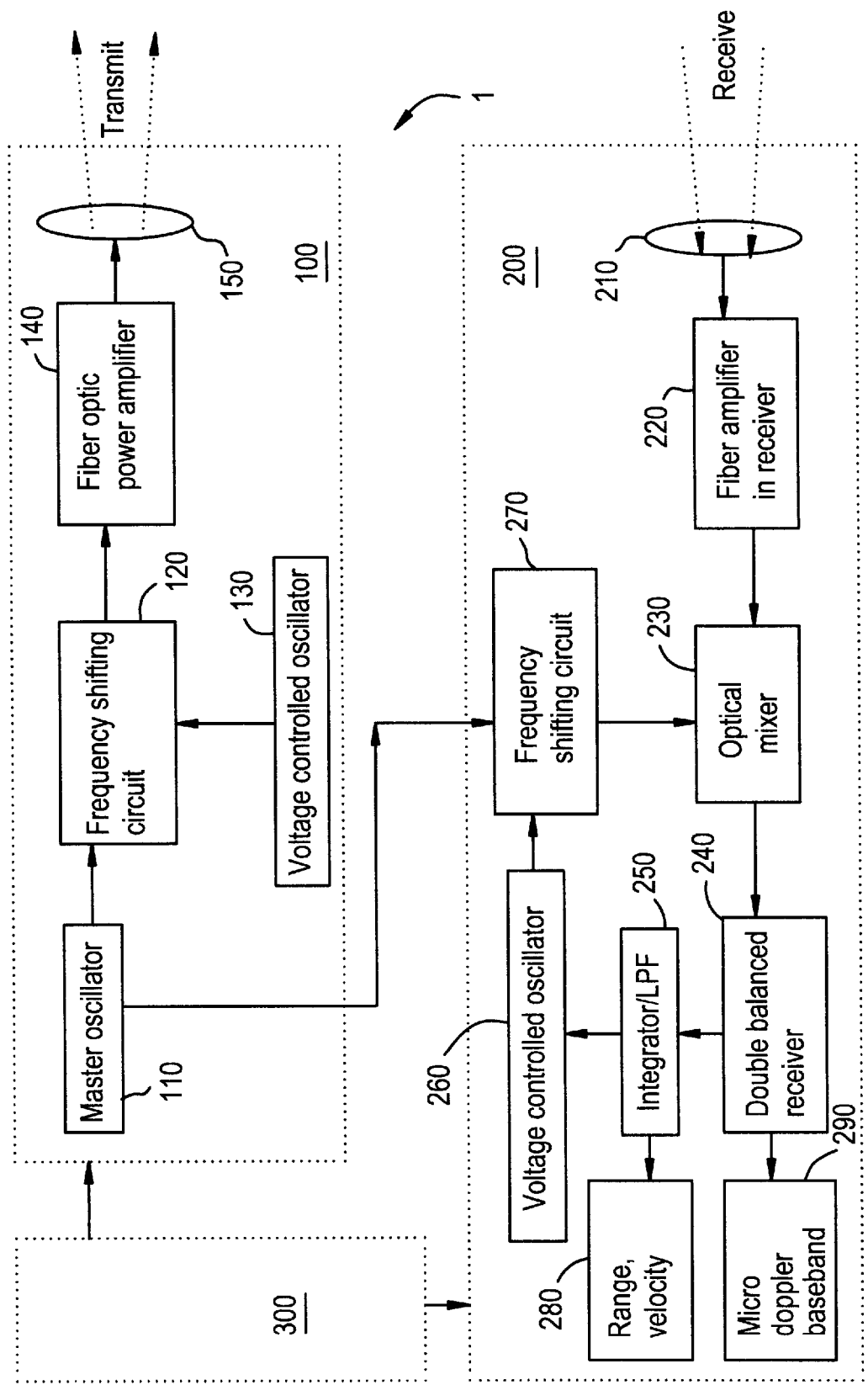
FIG. 1 is a high level block diagram of a fiber optic micro-doppler ladar system including both a transmitter and a receiver, both of which are operated by a controller.

One proposed fiber optic micro-doppler ladar system, which is the subject of a commonly assigned, concurrently filed patent application Ser. No. 08/782,175, 08/782,175 which application is incorporated herein by reference for all purposes, is illustrated in FIG. 1, wherein a fiber optic micro-doppler ladar system 1 includes a transmitter 100 and a receiver 200, both of which are preferably operated by a controller 300. The controller can include a computer, microcomputer or dedicated microprocessor, e.g., a digital signal processor, for controlling the transmitter 100 and receiver 200 during predetermined first and second operating modes, as discussed in greater detail below.

In transmitter 100, a master oscillator (MO) 110 is connected to a fiber optic power amplifier 140 via a frequency shifting (FS) circuit 120, which FS circuit receives a modulation frequency signal produced by a voltage controlled oscillator 130. Preferably, master oscillator 110 is a stable, very narrow linewidth laser, which operates in a $TEM_{00}$ mode at a frequency within the gain spectrum of the power amplifier 140 and which is coupled by optical fiber to deliver a continuous wave signal to downstream components in the transmitter 100. It will be appreciated that the master oscillator laser 110 can suitably be any conventional master oscillator laser. It should also be mentioned that some conventional components that are understood to be part of any practical fiber optic ladar system have been omitted from the drawings and detailed description of the preferred embodiments of the present invention so as not to obscure the fundamental features of the invention. For example, one of ordinary skill in this particular art would appreciate that an optical isolator would be located immediately downstream of the master oscillator 110 to prevent feedback from downstream components, e.g., power amplifier 140, that would induce instability in the master oscillator 110. The details of such components are well known to those skilled in the art and will not be discussed further.

Master oscillator (MO) 110 generates a first signal with a coherence time Tc, where:

$$Tc = I_c/c = 2\pi/\Delta\omega, \qquad (1)$$

where $I_c$ is the coherence length and $\Delta\omega$ is the linewidth of the laser beam. The first signal is preferably delivered to FS circuit 120, which performs a frequency translation or shifting function. The FS circuit 120 beneficially can be a photonic network or any one of several conventional devices such as an acousto-optic modulator. In any case, the frequency of the output signal $\omega_{out}(t)$ is translated up or down from the un-modulated carrier signal $\omega_0$ produced by the MO 110 by the frequency $\omega_{vco}(t)$ of the VCO 130. In other words, the output signal of FS circuit 120 can be determined from the expression:

$$\omega_{out}(t) = \omega_0 + \omega_{vco}(t). \qquad (2)$$

This frequency translation advantageously permits transmission of a frequency chirp on the output signal to establish an estimate of range to target and target velocity, as discussed in further detail below. It should be mentioned that the output signal of VCO 130 is a sawtooth function which, in an exemplary case, varies continuously from 10 megahertz (MHz) to 100 MHz and then back to 10 MHz. The sawtooth characteristic of the VCO 130 output was selected to minimize the stimulated Brillouin scattering (SBS) associated with power amplifier 140; the suppression of SBS enables generation of a high power transmit laser beam with minimum beam degradation.

A single fiber power amplifier 140 will suffice for some short range applications. However, a coherent array of optical fiber amplifiers collectively forming the fiber optic power amplifier 140 is particularly advantageous for those specific applications involving very long range or atmospheric conditions involving significant absorption or dispersion of the transmitted laser beam. Preferably, power amplifier 140 includes a predetermined length of rare earth doped optical fiber, which beneficially constitutes an amplifier section (gain medium). The optical fiber can advantageously be an optical fiber having a core doped with one of more rare earth elements, i.e., ytterbium, neodymium, praseodymium, erbium, holmium and thulium. Preferably, the optical fiber used in power amplifier 140, as well as in pre-amplifier 220, is a dual core optical fiber consisting of an inner core doped with one or more rare earth elements, an outer core surrounding the inner core, and a cladding surrounding the outer core. Most preferably, the fiber optic power amplifier includes one or more Yb:Er-doped optic fibers. In an exemplary case, the fiber optic power amplifier 140 includes one or more Yb:Er-doped single mode, e.g., $TEM_{00}$ mode, optical fibers.

With continuing reference to FIG. I, the transmit optics 150 can suitably be an optical lens (as shown), although a mirror, or an array of lensed fibers in a phased array could also be used. The function of the transmit optics 150 is to collimate the high power $TEM_{00}$ signal from the fiber optic power amplifier 140 and direct the collimated transmit laser beam towards a distant target. In an exemplary case, the transmit optics 150 is gimbal mounted so as to permit training of the transmit laser beam to sweep a portion of the sky in accordance with a predetermined sweep pattern.

The receive optics 210, which can be the same optics as the transmit optics 150 used to transmit the transmit laser beam, collect back-scattered light from the distant target and couple it into a single mode diode pumped fiber optic preamplifier 220. For ease of explanation, the transmit optics 150 and the receive optics 210 are shown separately in FIG. 1. The function of the preamplifier 220 is to amplify the received signal to a higher, more convenient optical signal level and to enhance the signal-to-noise (SNR) of the receiver. It should be noted that while preamplifier 220 is not strictly required if the Double Balanced Receiver (DBR) 240 achieves signal-shot-noise-limited performance, it does provide a degree of margin and robustness for the phase-locked loop (PLL) acquisition function performed in the receiver 200.

As discussed in greater detail below, components in ladar receiver 200 including an optical combiner 230, the DBR 240, an integrator/low pass filter (I/LPF) 250, a second voltage controlled oscillator 260 and a second FS circuit 270 advantageously form a PLL in the receiver 200. In an exemplary case, the optical combiner 230 connected between preamplifier 220 and DBR 240 can be a 3 dB fiber optic coupler, which linearly combines a frequency translated sample of the Master Oscillator signal generated by FS circuit 270 with the received signal and delivers equal amplitude combined signals to two photodiode detectors in DBR 240, as will be discussed in greater detail below with respect to FIG. 2. Additional details regarding, for example, the laser power amplifier are described in detail in copending, commonly assigned U.S. patent application Ser. Nos. 08/471,870 and 08/611,474, which applications are incorporated herein by reference for all purposes.

It should be noted that the output of micro-doppler baseband detector 290 corresponds to the vibrational signature of the target of interest while the output of I/LPF 250 permits extraction of both range and velocity information, as discussed in greater detail below. It should also be mentioned that I/LPF 250 beneficially can include filters for separating targets into various categories based on their doppler characteristic. For example, limiting target analysis to targets having a minimum doppler shift would avoid needless evaluation of stationary structures. In contrast, doppler filtering prior to analysis of a stationary object such as a bridge could avoid analysis of moving vehicles traveling over the bridge.

In order to recover the translational and micro-doppler information from the backscattered laser return, a frequency translated sample of the Master Oscillator is phase locked to the received signal. The FS circuit 270 in the receiver 200 translates the Master Oscillator frequency to $\omega_{lo}=\omega_0+\omega_{vc2}$ and this signal is used as the local oscillator (LO) signal provided to the optical mixer 230. The combination of the LO signal and the received backscattered light preferably is provided to double balanced receiver 240. The frequency $\omega_{vc2}$ output by the VCO 260 is controlled by the phase locked loop electronics so that the derived LO signal tracks the received signal in phase.

The micro-doppler signal is obtained by the micro-doppler baseband circuitry 290 from the AC component of the loop voltage when the loop is locked and tracking the net doppler frequency shift of the received signal. For a vibrational frequency of $\omega_{vib}$, the micro-doppler phase term above would be expressed as $2\omega_o\Delta x \cos \omega(t-T/2)/c$, which will be recovered as a component $\omega_{\mu d}$ on the loop control voltage, as discussed in greater detail below.

With continuing reference to FIG. 1, the controller 300 can be coupled to transmitter 100 and receiver 200 so as to permit the transmitter and receiver to be operated in first and second modes of operation during analysis of a target of interest. It will be appreciated that gross analysis of velocity and range can be performed using the chirped frequency transmit laser beam. However, the chirped frequency transmit laser beam is often not well suited to fine analysis of the target. Therefore, the VCO 130 is operated only until a gross range and velocity for the target of interest is obtained. During a second, CW mode of operation, the VCO 130 is turned OFF, which permits the PLL (elements 230, 240, 250, 260 and 270) in receiver 200 to settle and, thus, provide a better environment for vibration signature determination.

As discussed above, the chirped frequency is preferably selected so as to minimize SBS degradation in the transmit laser beam of transmitter 100. For that reason, the total power of the transmit beam can be expected to drop, which would normally result in a decrease in detection range using ladar system 1. It should be noted however that power amplifier 220 is a self-limiting component having a perceptible saturation characteristic. Stated another way, a drop in the backscattered signal strength would permit a higher gain in power amplifier 200. Thus, power amplifier 220 operates as if an automatic gain control circuit were part of the amplifier.

It will be appreciated that the fiber optic micro-doppler ladar system of FIG. 1, by virtue of its relatively short operating wavelength, is extremely sensitive to micro-doppler vibrations as compared with a conventional $CO_2$ micro-doppler ladar system, for example. However, this sensitivity is phase noise limited once the range of the target of interest exceeds the coherent length $I_c$ of the transmit laser beam. Phase noise in a laser source is generally reduced by careful design and isolation of the source from external perturbations such as vibrations of the laser structure or fluctuations in laser drive current. In contrast, the inventive method according to a first preferred embodiment according to the present invention allows compensating for the cumulative phase drift of a transmit laser beam electronically by measuring and cancelling the random drift in optical phase of the beam produced by a master oscillator over time periods greater than the coherence time period of the transmit laser beam. It should be mentioned that although the principles of operation of the present invention are generally applicable to all micro-doppler radar and ladar systems and sensors, discussion of the preferred embodiments according to the present invention will concentrate on compensation of the effects of phase noise in a fiber optic micro-doppler ladar system.

A preferred embodiment according to the present invention, which overcomes the problems discussed immediately above, is a phase drift compensating method. This method includes a step for continuously measuring the phase difference $\Delta(t,T)$, where $\Delta(t,T)=\phi(t)-\phi(t-T)$, between a signal emitted by the transmitter at the present moment E(t) and the signal emitted by the same transmitter at an earlier time E(t−T), where T is shorter, and preferably much shorter, than the coherence time Tc of the laser. It will be noted that $T_c=I_c/c$. The method also includes a step for summing the phase difference over the round trip propagation time $T_p$ to predict the value of $\Delta(t,T)$ when backscattered light is introduced to the optical mixer in the coherent receiver. In practical cases of interest, $T_p$ will be greater than the nominal coherence time $T_c$ for the transmit laser beam. The measured value of $\Delta(t,T)$ is used to phase modulate a sample of the laser beam produced by the master oscillator, which sample corresponds to the arrival time of the backscattered light, so as to permit a cumulative phase drift compensated (CPDC) laser beam sample to be used as the local oscillator signal in the coherent receiver.

Stated another way, a first preferred embodiment according to the present invention is a method for impressing the calculated phase error accumulated during the round trip propagation time $T_p$ on the sample of the output laser beam to simulate an output laser beam delayed by an equivalent path length. This is equivalent to generating a local oscillator signal $E(t)\exp(j\Delta(t,T))$ which is equal to E(t−T). Advantageously, the performance of a CPDC homodyne micro-doppler ladar system is substantially similar to the performance of a non-compensated micro-doppler ladar system using a very narrow linewidth.

Figure 2:
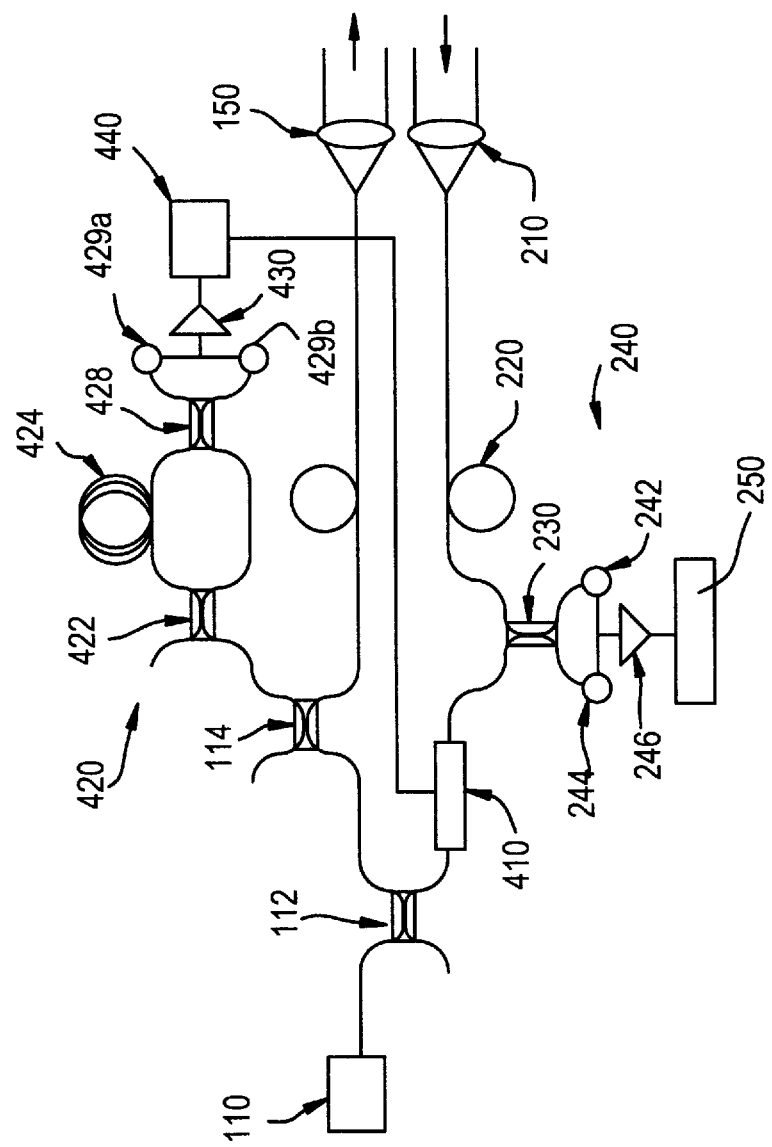
FIG. 2 is a high level partially schematic, partially block diagram of selected components of a fiber optic micro-doppler ladar system amplifier which includes components for phase drift detection and compensation.

A detailed understanding of the inventive method which is a first preferred embodiment of the present invention can be attained by considering selected components of a micro-doppler ladar system according to a second preferred embodiment of the present invention shown in FIG. 2. It will be appreciated that the preferred embodiments pertain to a CW operating mode of a micro-doppler ladar system and, thus, components such a transmitter VCO and frequency shifting circuitry have been omitted from FIG. 2 so as not to obscure the novel features and aspects of the present invention. Moreover, the components depicted in FIG. 2 advantageously can be used as a sensor system for obtaining vibration signatures of stationary structures such as bridges.

FIG. 2 provides a logical framework to explain the principle of the invention. As shown in FIG. 2, an output laser beam produced by the master oscillator 110 has a frequency $\omega_0$ with a time varying phase $\phi(t)$, which leads to a finite coherence time $T_c$ and finite coherence length $I_c$. The output laser beam produced by the MO 110 can alternatively be expressed as $A\exp\{\omega_0+\phi(t)T\}$. This output laser beam is then divided into first and second laser beams by a first beam splitter 112. Preferably, the first laser beam is provided as a local oscillator signal to the double balanced receiver 240 via a phase modulator 410 and an optical mixer 230; the second laser beam is provided to a phase sensor and power amplifier beam splitter 114. Beam splitter 114 splits the second laser beam into third and fourth laser beams. The third laser beam is amplified in power amplifier 140 to thereby generate the transmit laser beam directed by transmit optics 150; the fourth laser beam is provided to a phase sensor 420.

The phase sensor 420 advantageously includes a phase sensor beam splitter 422, which is connected to a phase sensor optical mixer 428 via parallel optical paths. One of the optical paths advantageously includes a delay loop 424 while the other optical path is a simple optical fiber 426. The combined laser beam generated by optical mixer 428 is output to a pair of photodiodes 429a and 429b. It will be recognized that the phase sensor 420 is an unequal path length Mach Zehnder interferometer for which the differential delay is a value T, which advantageously is set by design to be significantly less than the coherence time, Tc, of the MO 110 and substantially shorter than the round trip delay time, $T_P$.

Advantageously, the intensities of the output laser beam produced by MO 110 in optical fiber 426 and the delayed version of this output laser beam produced in delay loop 424 is measured by the photodiodes 429a, 429b. The differences between the outputs of the photodiodes 429a, 429b, $\Delta(t,T)$, represents the phase difference between the output laser beam produced by MO 110 and the delayed laser beam produced by delay loop 424. This value $\Delta(t,T)$ is measured by fast electronics, represented by the amplifier 430, once each delay period (i.e., at t, t+T, t+2T, and so on), and each successive value is stored in, for example, a logical bucket-brigade shift register included in cumulative phase error processor 440. It should be mentioned that the actual method is slightly more complex than that described, but, since it is well known to those of ordinary skill in the art, will not be described in greater detail. Preferably, the successive values for up to NT are stored in error processor, where T =NT. The N+1th value is added to a sum which represents the computed value of $\Delta(t,T)$ and which is updated for every change in delay interval. It will be recognized that since the range R to the target of interest changes with time, the value of N must be measured and updated periodically, e.g., a lookup table in error processor 440 can be used to determine N for a number of discrete ranges $R_i$.

Preferably, the computed value of $\Delta(t,T)$ is then applied to the phase modulator 410, which advantageously can be disposed upstream of the optical mixer 230 in the receiver 200. The modulation produced by the phase modulator 410 is equal to the accumulated phase drift during the round trip propagation delay $T_p$ between the ladar system 1 and the target of interest. Advantageously, correction of the output laser beam supplied to optical mixer 230 permits the receiver 200 to function as an equal path interferometer; thus, laser phase noise has no effect on the receiver 200. Naturally, an error in making each phase measurement propagates through the ladar system 1. However, since these individual errors add randomly, the error in the computed phase drift $\Delta(t,T)$ will grow proportional to the square root of T, $\sqrt{T}$. The signal from the double balanced receiver 240 is then processed, as discussed in detail below, to recover the vibration spectrum of the target of interest. It should be mentioned that the vibration spectrum is obtained with the added benefit that the deleterious effects of laser phase noise have been either eliminated or effectively removed. It will be appreciated that phase noise elimination is a profound advantage of the system illustrated in FIG. 2.

The double balanced receiver (DBR) 240 shown in FIG. 1 preferably includes photodiodes 242, 244 and amplifier 246, as depicted in FIG. 2. The optical signal at one of the photodiodes 242, 244 can be represented by the equation:

$$A_{det}=A_{mp}\cos\left[(\omega_0+\omega_{vc2})t+\Phi_0\right]+A r\cos\left[(\omega_0+\omega_{vcl})(t-\tau)+\sigma(t-\tau/2)\right] \quad (3)$$

where $\delta(t-T/2)$ represents the phase modulation of the transmitter signal induced by the vibrations of the target and is given by $\delta(t-T/2)=2\omega_0\Delta x(t-T/2)/c$, where $\Delta x(t-T/2)$ is the vibrational displacement of the target of interest. In the double balanced receiver 240, two such output signals are combined in a difference amplifier that allows rejection of amplitude noise from the MO 110. It will be appreciated that this technique is well known in the field of telecommunications and will not be discussed in any greater detail. It will also be appreciated that signal generation in DBR 240 is substantially identical to signal generation in phase sensor 420. DBR 240 can also include an automatic gain control circuit to insure that the output of DBR 240 is suitable for further processing in I/LPF 250 and the micro-doppler baseband detector 290.

The AC component of detected photocurrent at each of the photodetectors 242, 244 in double-balanced receiver 240 is given by the equation:

$$i_s = KA_{mo}A_r \cos\left[(\omega_{vc2} - \omega_{vc1})\, t + \omega_0 T + \Phi_0 - \sigma(t - T/2)\right] \quad (4)$$

It should be noted that the term $\omega_0 T$ contains the translational doppler information, where $T = 2R/c = 2(R_0 - vt)/c$, where $R_0$ is the instantaneous range and $v$ is the closing velocity of the target of interest. It will also be appreciated that the translational doppler frequency is therefore expressed as $\omega_d = -2\,\omega_0 v/c$, which can be tracked out by the phase locked loop in the receiver, i.e., the loop essentially drives the output of each of the balanced detectors to the same amplitude and in effects sets $\omega_{vc2} - \omega_{vc1} = \omega_d + \omega_{\mu d}$, and hence the closing velocity is obtained from the mean value of the loop control voltage using range-velocity processing circuitry 280 and display 282, which circuitry is well known to those of ordinary skill in the art and will not be discussed further.

Figure 3:
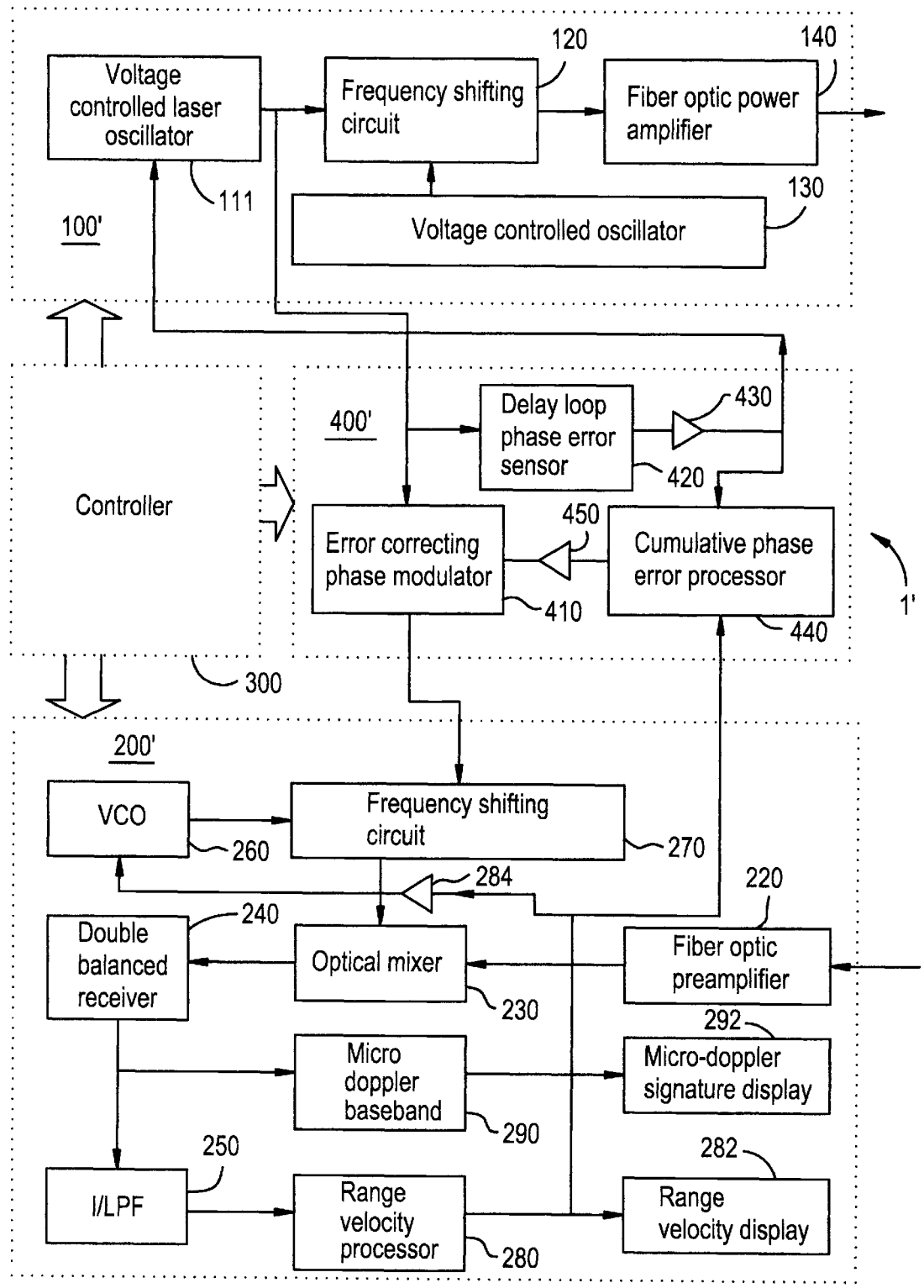
FIG. 3 is a high level block diagram of a homodyne coherent fiber optic micro-doppler doppler ladar system according to the present invention.
Figure 4:
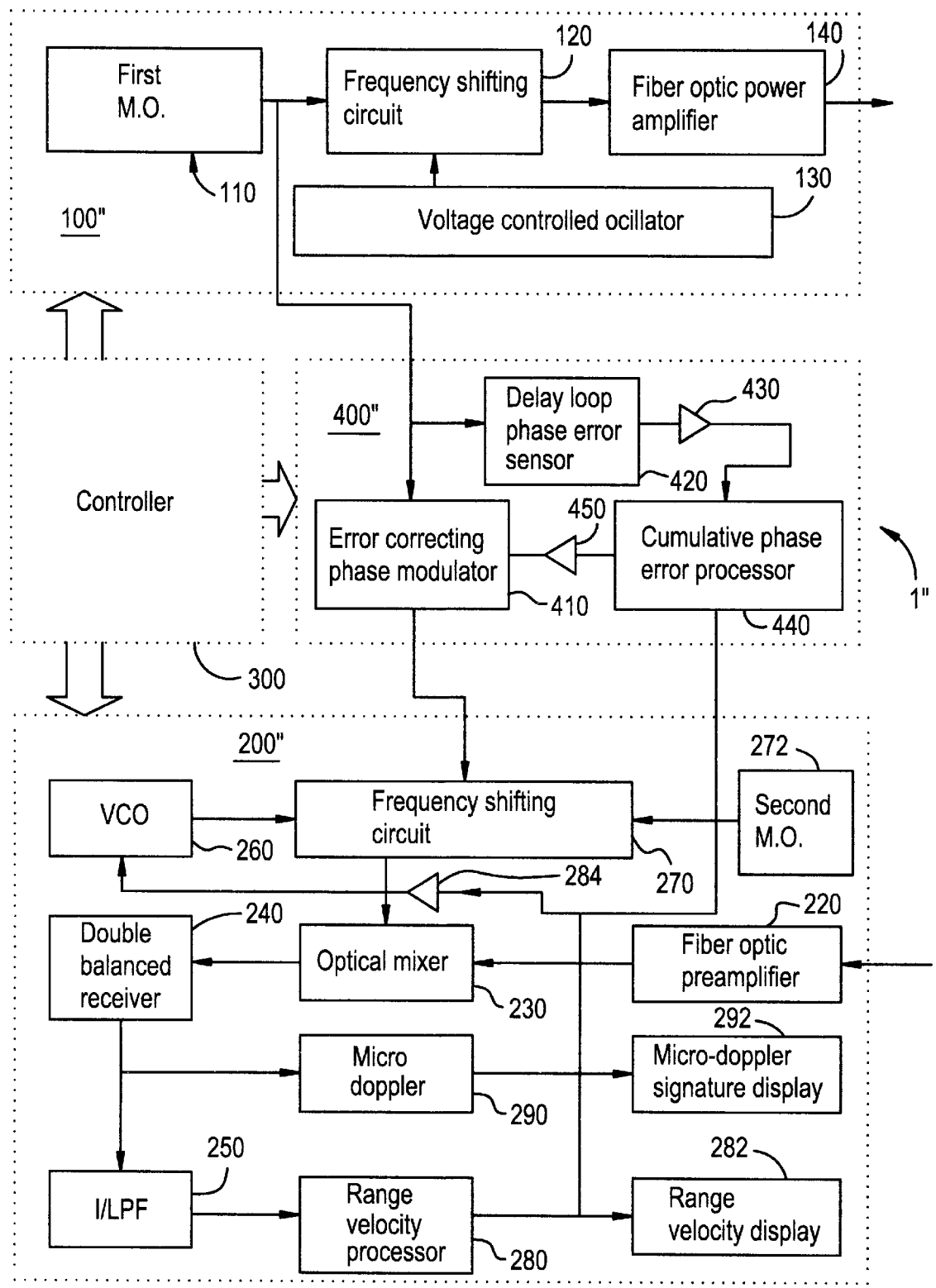
FIG. 4 is a high level block diagram of a heterodyne coherent fiber optic micro-doppler ladar system according to the present invention.

If the target is moving, the signal from the double balanced receiver 240 will be offset in frequency due to the Doppler effect by an amount $\Delta\omega$, where $\Delta\omega = 2V/\lambda_0$. That is, the micro-doppler spectrum is shifted from baseband by $\Delta\omega$, so that the closing velocity of the target of interest can be determined from the mean value of the total doppler spectrum. Although shifted from baseband, the micro-doppler spectrum is not corrupted by laser phase noise in the micro-doppler ladar system of FIG. 2; the target vibration spectrum can be recovered by beating the signal back to baseband. One method to recover translational doppler is to shift the frequency of the receiver 200 reference signal after effecting the laser phase error correction by using an appropriate (e.g. an acousto-optic) modulator, as shown in FIGS. 1, 3 and 4, and low-noise RF oscillator to produce an output receiver signal at an intermediate frequency. The micro-doppler signal is recovered after frequency conversion to baseband. This, or similar circuitry, is not shown in FIG. 2 but is well understood by those skilled in the art.

The effects of phase noise in the laser source are compensated by the present invention in either homodyne (FIG. 3) or off-set heterodyne (FIG. 4) micro-doppler ladar system configurations, as discussed in greater detail immediately below.

Referring to FIG. 3, a homodyne coherent micro-doppler ladar system according to the second embodiment of the present invention includes a transmitter 100', a receiver 200', the controller 300 and a cumulative phase delay compensator 400. It will be noted that the discrete elements 410, 420, 430, 440 and 450 included in FIG. 2 have been collectively grouped in order to form compensator 400. Alternatively, the discrete elements 410, 420, 430, 440 and 450 can be selectively located in either the transmitter 100' or the receiver 200'. Preferably, the MO 110 in FIG. 1 is replaced by a voltage controlled laser oscillator 111, which receives an error control signal from sensor 420 via amplifier 430; advantageously, the error control signal drives VCO 111 in such a way that the phase drift of laser oscillator 111 is minimized to thereby limit the cumulative phase drift during the round trip propagation period $T_P$.

As shown in FIG. 3, the cumulative phase error processor 440 receives the amplified phase error signal from amplifier 430 and a range estimate $E_R$ from range and velocity processor 280 in receiver 200. Advantageously, the range estimate $E_R$ is used to determine the number N of samples needed to accurately compensate for the phase drift during the period $T_P$. It should also be noted that VCO 260 receives appropriate portions of the signal generated by range and velocity processor 280 via amplifier 284. As noted above, the vibration signature of the target of interest is extracted from the output of DBR 240 by micro-doppler baseband circuit 290 and can be displayed using micro-doppler signature display 292.

In an alternative embodiment shown in FIG. 4, a heterodyne version of the micro-doppler doppler ladar system 1" includes first and second master oscillators 110 and 272 in transmitter 100" and receiver 200", which subsystems are preferably operated by controller 300 and which subsystems advantageously are interconnected by the cumulative phase drift compensator 400". It will be appreciated that first and second master oscillators in conventional ladar systems would be required to have natural oscillation linewidths that are narrower than the spectrum of the induced phase deviations in the backscattered light. However, since the compensator 400" in the micro-doppler ladar system 1" extends the effective coherence length beyond the actual coherence length $l_c$, the linewidth of the master oscillator may be somewhat broader than for conventional systems.

It should be mentioned that a particularly suitable application for the present invention would include any remote vibration sensing application for which the range to the target would be sufficiently long as to pose laser phase stability problems with respect to the micro-doppler signal recovery process. A significant subset of the above-mentioned application is in remote sensing of target vibrations for applications such as non-cooperative target classification or intelligence gathering in situations under which the laser phase noise of the master oscillator effectively masks the signal of the target of interest, i.e., a target of interest located at a range R beyond the coherence length $l_c$ of the MO 110 in the transmitter 100. It will be appreciated that micro-doppler ladar systems can be used to measure the vibrational spectrum of bridges, buildings, pipelines, pumps, taxiing aircraft, volcanoes, etc.; the vibration spectrum obtained can reveal the mechanical health of machinery and structures for a variety of purposes.

Additionally, the increased sensitivity of a sensor system including the cumulative phase drift compensator would increase the accuracy of vital sign measurements of remotely located people or animals. Furthermore, the present invention is not limited to systems for obtaining vibration signatures of objects; other parametric signatures advantageously can be obtained. In all cases, when $R >> l_c$, the effects of laser phase noise will degrade or render the measurement impossible if not compensated by the method according to the present invention.

Advantageously, the method according to a preferred embodiment and the apparatus according to the second preferred embodiment of the present invention can best be implemented using real-time digital signal processing to provide control of the generated optical signal applied to the optical mixer, but there are several variants of the basic control system that are feasible. These differ in hardware and/or software, but all use well established components and digital signal processing techniques. For example, the homodyne coherent micro-doppler laser system 1' illustrated in FIG. 3 could be replaced by the heterodyne micro-doppler ladar system 1" illustrated in FIG. 4. Additionally, the components can be varied in location, e.g., the compensator generally denoted 400 of FIGS. 3 and 4 could advantageously be an integral part of the receiver 200' or 200". Moreover, various combinations of the elements depicted in FIGS. 2–4 can be made to realize various alternative embodiments of the micro-doppler ladar system according to the present invention. For example, the laser oscillator 111 in FIG. 3 could be replaced by MO 110 so that the feedback connection from amplifier 430 can be omitted. It should also be recognized that the elements 430, 440 and 450 could alternatively be an analog to digital converter, a digital signal processor, and a digital to analog converter, respectively.

The disclosed high power micro-doppler ladar system can be built to detect and classify non-cooperative aircraft targets at ranges up to 100's of kilometers. In addition, a coherent transmitter array of high power fiber amplifiers, permits scaling to even greater ranges. The use of a sensitive optical fiber preamplifier in the receiver also offers significant flexibility and benefits. Inclusion of a cumulative phase drift compensator between the transmitter and the receiver for eliminating phase noise sensitivity in the receiver provides a significant improvement over conventional micro-doppler ladar systems, i.e., the compensator significantly increases the effective range of the micro-doppler ladar system in the vibration signature acquisition mode of operation. The disclosed system according to the second preferred embodiment of the present invention is highly sensitive, compact, rugged, highly efficient, lightweight, and reliable, and can provide revolutionary installation flexibility. Moreover, since the micro-doppler ladar system leverages off developments in the telecommunications field, system costs are expected to be lower initially and to drop even further in the foreseeable future.

Finally, it should be mentioned that the High Power Fiber Optic Laser (HPFOL) used in an exemplary micro-doppler ladar system according to the present invention offers a practical way to scale to a hard-kill weapon performance level (100 kW–2 MW). The possibility exists that a common laser aperture might allow a target to be detected in a ladar mode, classified by its micro-doppler signature, and destroyed by increasing the power by 1000×.

The micro-doppler ladar system discussed above is unique in its ability to scale the transmitter output power up to arbitrarily high levels to meet stringent range requirements. Since laser-diode-pumped rare-earth-doped optical fiber amplifiers can be tuned over a wavelength range of tens of nanometers, it is possible to select advantageous operating wavelengths that do not overlap the numerous fine absorption lines that occur in the atmosphere. The highly coherent laser signal required can be generated at conveniently low levels and amplified up to any output power level required. Eliminating phase noise using a cumulative phase drift compensator has the same effect as narrowing the linewidth of the selected operating transmit laser beam frequency.

The ladar system according to the present invention is basically modular and can be located or distributed wherever space is available in a vehicle because the power is being transmitted to the output aperture via a fiber optic bundle. Hence the microdoppler ladar system according to the present invention requires no dedicated beam paths, rigid structures and precision beam relay optics, as are needed by a conventional ladar system. Moreover, the efficiency of the transmitter using laser-diode-pumped, rare-earth-doped optical fiber amplifiers in a phased array MO-PA will be much higher than a conventional diode pumped $TEM_{00}$ mode laser. The same rare-earth-doped fiber amplifier technology can be used to build a complementary ladar receiver based on sensitive pre-amplification of the optical signal received from the distant target.

The preferred embodiments according to the present invention were conceived as a result of design and theoretical studies to deal with the limitations of laser phase noise produced in a fiber optic based micro-doppler radar system. A fiber optic micro-doppler radar is itself so fundamentally innovative that a copending patent application (Serial No. (Docket No. D3987)), which application is incorporated by reference, is being concurrently filed. This fiber optic micro-doppler ladar system will improve performance, reduce size, weight, prime power, and enhance ruggedness as compared to the present 10.6 $\mu$m $CO_2$ system now under development as part of the Radiant Mist program discussed above. However, a problem was encountered in the reported level of phase noise for commercially available 1.06 $\mu$m and 1.55 $\mu$m single frequency laser sources that would seriously restrict range. The inventive method of electronically measuring and compensating for cumulative phase error was conceived as a nonobvious solution to this dilemma. The obvious and conventional approach would be to try to reduce the phase noise of the laser source.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A micro-doppler ladar system for identifying and analyzing a target of interest, comprising:

a transmitter for producing a transmit laser beam and a laser beam sample;

a coherent receiver responsive to backscattered light produced by interaction of said transmit laser beam with the target of interest and generating range and velocity data and a characteristic signature of the target of interest responsive to said backscattered light and a phase compensated laser beam;

a phase noise compensator for generating said phase compensated laser beam responsive to said laser beam sample; and a controller for controlling operation of said transmitter, said phase noise compensator, and said receiver.

2. The micro-doppler ladar system as recited in claim 1, wherein said controller is operated to selectively cause the micro-doppler ladar system to operate in a target acquisition mode of operation in which said range and velocity data are generated and a signature acquisition mode of operation in which said characteristic signature is generated.

3. The micro-doppler ladar system as recited in claim 2, wherein said transmit laser beam generated during said target acquisition mode of operation is a chirped frequency transmit laser beam, and wherein said transmit laser beam generated during said signature acquisition mode of operation is a continuous wave transmit laser beam.

4. The micro-doppler ladar system as recited in claim 2, wherein said characteristic signature is a vibration signature.

5. The micro-doppler ladar system as recited in claim 1, wherein said phase noise compensator comprises:

a phase error sensor for generating a phase error signal responsive to said laser beam sample at N successive times during a predetermined time period, to thereby generate N corresponding values of said phase error signal, where N is a positive integer;

a phase error accumulator for accumulating said N values of said phase error signal, to thereby generate a cumulative phase error signal; and a phase modulator for correcting the phase of said laser beam sample responsive to said cumulative phase error signal, to thereby generate said phase compensated laser beam.

6. The micro-doppler ladar system as recited in claim 5, wherein said phase error sensor comprises:
   a beam splitter receiving said laser beam sample and generating first and second laser beams;
   an optical mixer for generating a mixed laser beam;
   an optical fiber operatively connected between said beam splitter and said optical mixer for transmitting said first laser beam;
   a delay loop operatively connected between said beam splitter and said optical mixer for delaying said second laser beam for said predetermined time period; and
   a double balanced receiver receiving said mixed laser beam for generating said phase error signal.

7. The micro-doppler ladar system as recited in claim 5, wherein said phase error sensor is a Mach-Zehnder interferometer with a fist optical path length greater than a second optical path length.

8. The micro-doppler ladar system as recited in claim 5, wherein said phase error compensator comprises a digital signal processor.

9. The micro-doppler ladar system as recited in claim 1, wherein said coherent receiver comprises an optical fiber pre-amplifier for amplifying said backscattered light.

10. A micro-doppler ladar system for identifying and analyzing a target of interest, comprising:
    first means for generating a primary laser beam;
    second means for amplifying said primary laser beam so as to generate a transmit laser beam;
    third means for transmitting said transmit laser beam towards the target of interest;
    fourth means for measuring phase error between said primary laser beam and a delayed primary laser beam to thereby generate a phase error signal;
    fifth means for compensating said primary laser beam responsive to said phase error signal so as generate a phase compensated primary laser beam;
    sixth means receiving backscattered light produced by interaction between said transmit laser beam and the target of interest and said phase compensated primary laser beam for generating an electrical signal indicative of the target of interest, substantially phase noise free;
    seventh means for determining range and velocity responsive to said electrical signal; and
    eighth means for determining a characteristic signature of the target of interest different from both range and velocity.

11. The micro-doppler ladar system as recited in claim 10, wherein at least one parameter of said transmit laser beam varies so as to permit the micro-doppler ladar system to operate in a target acquisition mode of operation wherein range and velocity data are produced by said seventh means and a signature acquisition mode of operation wherein said characteristic signature is determined by said eighth means.

12. The micro-doppler ladar system as recited in claim 11, wherein said at least one parameter is frequency and wherein said transmit laser beam generated during said target acquisition mode of operation is a chirped frequency transmit laser beam and wherein said transmit laser beam generated during said signature acquisition mode of operation is a continuous-wave transmit laser beam.

13. The micro-doppler ladar system as recited in claim 11, wherein said characteristic signature is a vibration signature.

14. The micro-doppler ladar system as recited in claim 10, wherein said fourth means comprises an unequal path length Mach Zehnder interferometer.

15. The micro-doppler ladar system as recited in claim 10, wherein said fourth means comprises:
    a beam splitting means receiving said primary laser beam and generating first and second secondary laser beams;
    optical mixing means for generating a mixed laser beam;
    means operatively connected between said beam splitting means and said optical mixing means for transmitting said first primary laser beam;
    delay means operatively connected between said beam splitting means and said optical mixing means for delaying said second primary laser beam for a predetermined time period; and
    a double balanced receiving means receiving said mixed laser beam for generating said phase error signal.

16. The micro-doppler ladar system as recited in claim 10, wherein said fifth means comprises:
    signal processing means receiving said phase error signal for generating a propagation period compensation signal; and
    phase modulating means receiving said propagation period compensation signal and said primary laser beam for generating said phase compensated primary laser beam.

17. The micro-doppler ladar system as recited in claim 10, wherein said sixth means further comprises an optical fiber pre-amplifier means for amplifying said backscattered light.

18. A method of operating a micro-doppler ladar system including a transmitter, a phase error compensator, and coherent receiver for identifying and analyzing a target of interest, the method comprising the steps of:
    generating a primary laser beam;
    amplifying said primary laser beam in an optical fiber amplifier so as to generate a transmit laser beam;
    transmitting said transmit laser beam towards the target of interest;
    generating first and second secondary laser beams responsive to said primary laser beam;
    generating a mixed laser beam by mixing said first and second secondary laser beams;
    generating an electrical signal indicative of the target of interest responsive to both received backscattered light produced by interaction between said transmit laser beam and the target of interest and said mixed laser beam;
    determining range and velocity responsive to said electrical signal; and
    ascertaining a characteristic signature of the target of interest different from both range and velocity responsive to said electrical signal.

19. The method for operating a micro-doppler ladar system as recited in claim 18,
    wherein the generating step comprises the step of generating said primary laser beam switching repeatedly between first and second frequency characteristics;
    wherein the determining step is performed while said primary laser beam exhibits said first frequency characteristic; and
    wherein the ascertaining step is performed while said primary laser beam exhibits said second frequency characteristic.

20. The method for operating a micro-doppler ladar system as recited in claim 18, wherein said characteristic signature is a vibration signature.

21. A phase error compensator for a micro-doppler ladar system including a transmitter producing a primary laser beam and a transmit laser beam and a receiver receiving backscattered light and a reference laser beam adapted to identify and analyze a target of interest, comprising:

a phase error sensor receiving a primary laser beam and generating a phase error signal having N values at N respective times;

a phase error processor receiving said N values of said phase error signal during a predetermined time period for generating an phase error compensation signal; and a phase modulator receiving said primary laser beam and said phase error compensation signal for generating the reference laser beam;

wherein N is a positive integer; and wherein the reference laser beam is phase noise insensitive.

22. The phase error compensator for the micro-doppler ladar system as recited in claim 21, wherein said phase error sensor comprises:

a beam splitter receiving said primary laser beam and generating first and second laser beams;

an optical mixer for generating a mixed laser beam;

an optical fiber operatively connected between said beam splitter and said optical mixer for transmitting said first laser beam;

a delay loop operatively connected between said beam splitter and said optical mixer for delaying said second laser beam for a predetermined short time period which is an integer multiple of said predetermined time period; and a double balanced receiver receiving said mixed laser beam for generating said phase error signal.

23. The phase error compensator for the micro-doppler ladar system as recited in claim 21, wherein said phase error sensor comprises an unequal path length Mach Zehnder interferometer.

24. The phase error compensator for the micro-doppler ladar system as recited in claim 21, wherein said phase error processor comprises a digital signal processor.

25. A micro-doppler ladar system for identifying and analyzing a target of interest, comprising:

a transmitter for producing a transmit laser beam by amplification of a primary laser beam in an optical fiber amplifier, said amplifier including:

an oscillator for generating the primary laser beam;

a voltage controlled oscillator (VCO) for generating a VCO signal having a predetermined, repetitive frequency pattern;

a frequency shifting device for varying the frequency of said primary laser beam responsive to said VCO signal to thereby produce a frequency-varying primary laser signal; and an optical fiber amplifier for amplifying said frequency-varying primary laser signal to thereby produce a transmit laser beam;

a phase error compensator receiving said primary laser beam and generating a phase compensated laser beam, said compensator comprising:

a phase error sensor for generating a phase error signal having N values responsive to said primary laser beam at N successive times during a predetermined time period, where N is a positive integer;

a phase error accumulator for accumulating said N values of said phase error signal, to thereby generate a cumulative phase error signal; and a phase modulator for correcting the phase of said primary laser beam responsive to said cumulative phase error signal to thereby generate said phase compensated laser beam;

a coherent receiver responsive to backscattered light produced by interaction of said transmit laser beam with the target of interest and said phase compensated laser beam for generating range and velocity data and a characteristic signature of the target of interest, said coherent receiver including:

an optical fiber pre-amplifier for amplifying said backscattered light to thereby produce an amplified return laser beam;

a phase locked loop receiving said phase compensated laser beam and said amplified return laser beam for generating an electrical signal indicative of range, velocity and a characteristic signature of the target of interest; and a controller for controlling operation of said transmitter, said phase error compensator and said receiver in a target acquisition mode of operation in which said range and velocity data are easily extracted from said electrical signals and a signature acquisition mode of operation in which said characteristic signature is easily extracted from said electrical signal.

26. The micro-doppler ladar system as recited in claim 25, wherein said oscillator comprises a voltage controlled laser oscillator responsive to said phase error signal.

27. The micro-doppler ladar system as recited in claim 25, wherein said phase error sensor comprises an unequal length Mach Zehnder interferometer.

28. The micro-doppler ladar system as recited in claim 25, wherein said phase error accumulator comprises a digital signal processor.

29. A vibration sensor for generating a vibration signature responsive to a cumulative phase drift compensated laser beam, said vibration sensor comprising:

an equal path interferometer, which includes:

a first optical path including an amplifier for amplifying a primary laser beam so as to generate a transmit laser beam, said first optical path further including a path section through a naturally occurring environment; and a second optical path including a phase error sensor for generating a signal indicative of phase error during a propagation period of said transmit laser beam, said second optical path further including a phase modulator for phase error correcting said primary laser beam so as to produce the cumulative phase drift compensated laser beam having a delay equal to said propagation period.

30. The vibration sensor as recited in claim 29, wherein said phase error sensor comprises an unequal path length Mach Zehnder interferometer.

31. The vibration sensor as recited in claim 29, wherein said naturally occurring environment is the earth's atmosphere.

32. A method for compensating a reference signal used in a coherent receiver of a micro-doppler sensor having a transmitter, the method comprising the steps of:

repeatedly measuring phase differences between a signal emitted by the transmitter a first time and a previous signal emitted at a previous time so as to produce N phase error signals, where N is a positive integer;

accumulating said N phase error signals over a propagation time between the transmitter and the coherent receiver so as to produce a cumulative phase error signal; and modulating a signal produced by the transmitter at the end of said propagation period so as to generate a compensated reference signal having a phase characteristic substantially identical to the signal produced by the transmitter and the beginning of said propagation period.

* * * * *